2,666,325

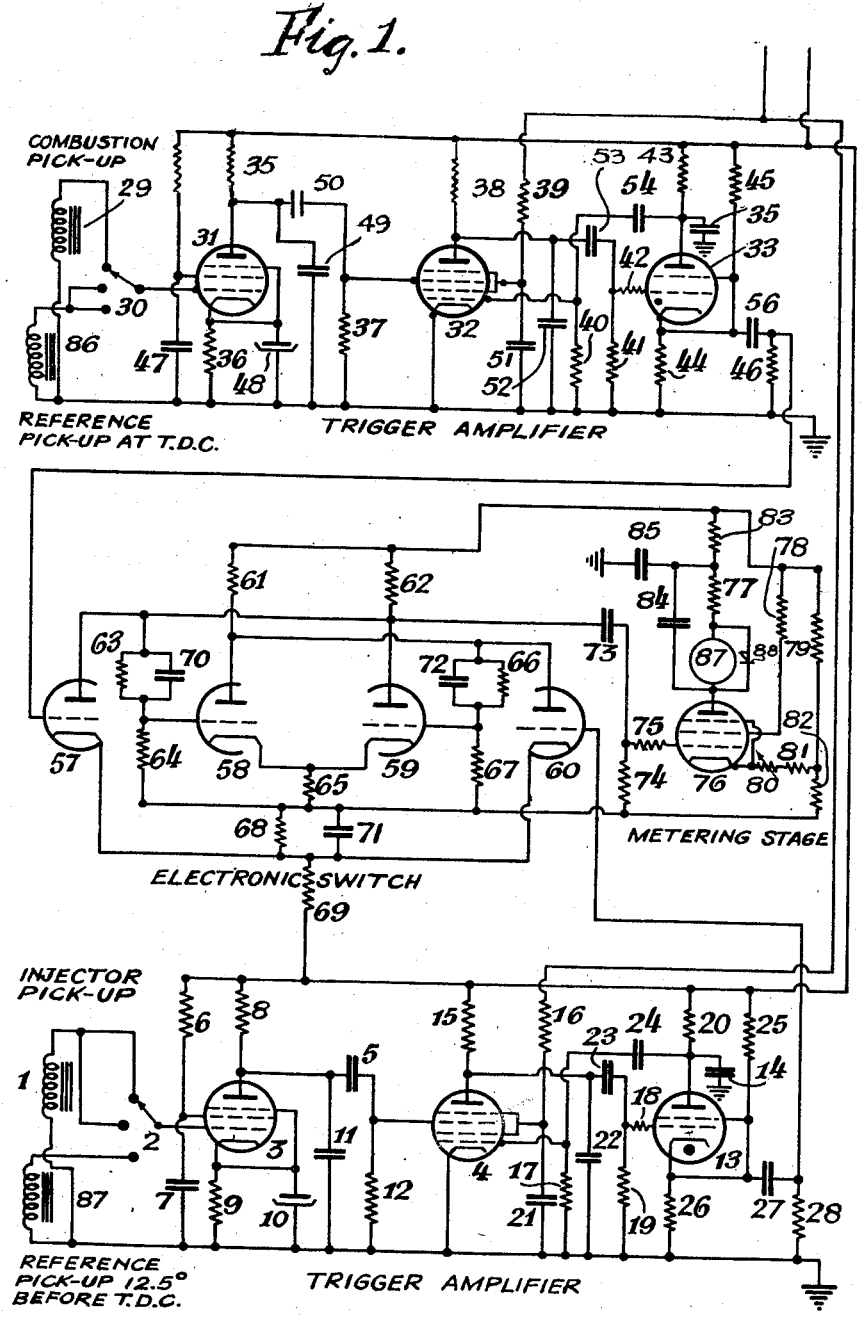

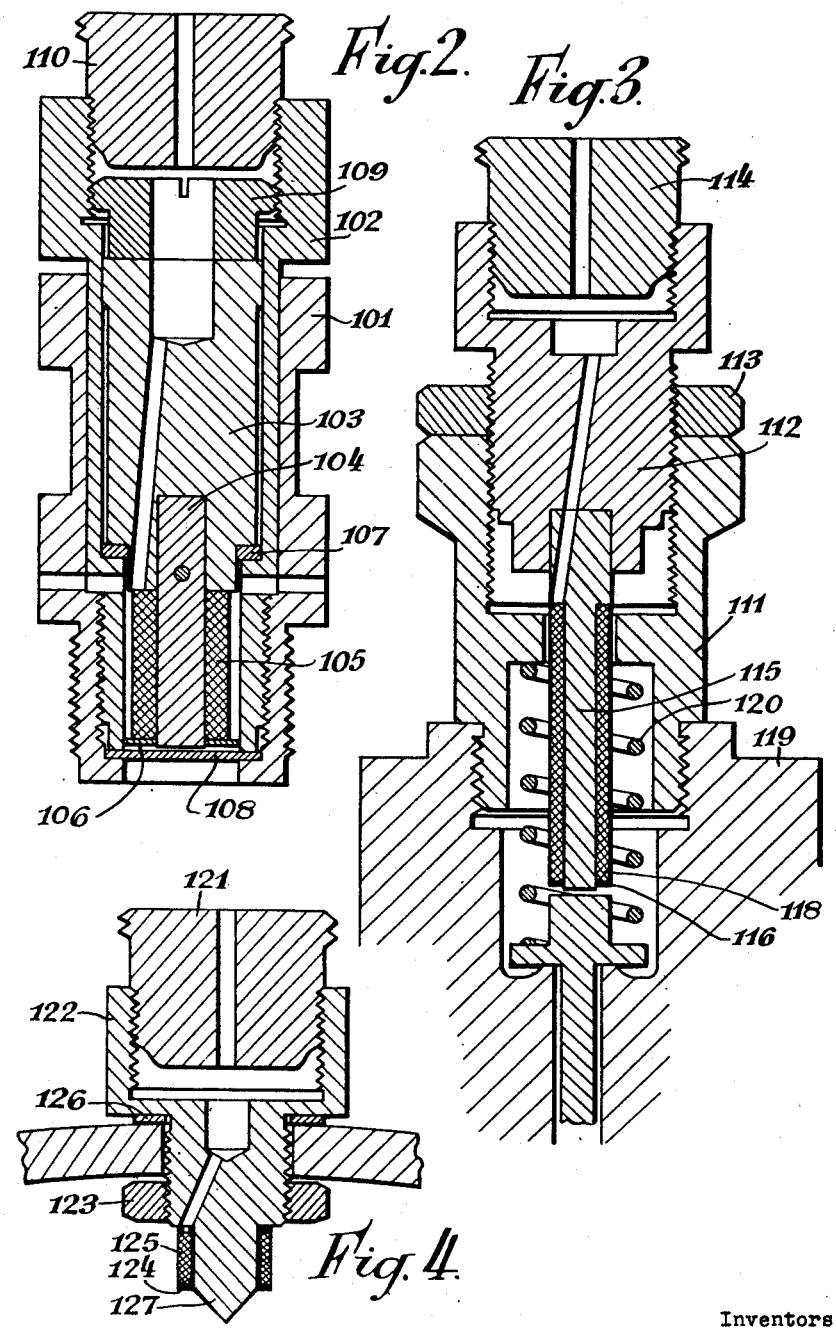

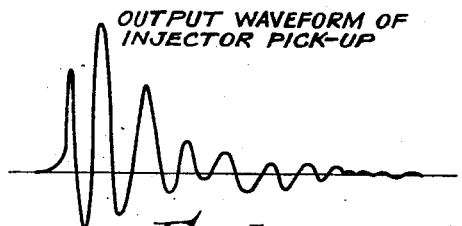
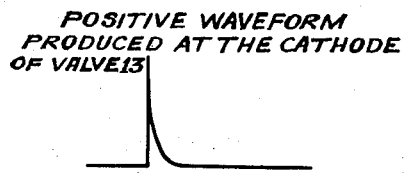
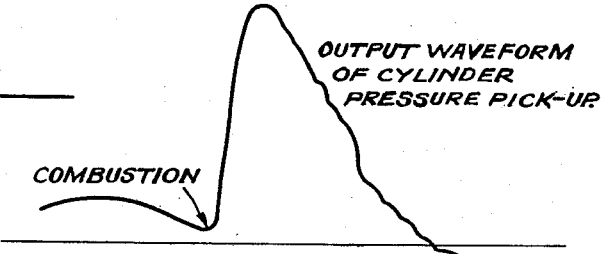
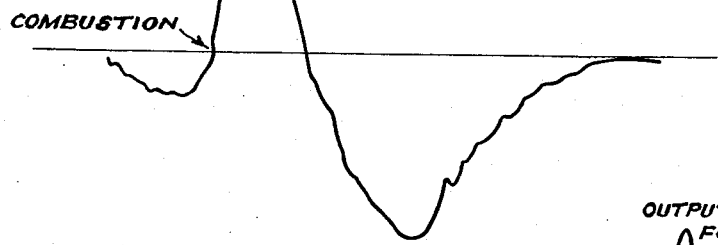
Inventors:
John Granville Withers
Henry James Hulf
Alexander Rubach Patented Jan. 19, 1954

UNITED STATES PATENT OFFICE 2,666,325

ELECTRONIC SELECTION OF A COMBUSTION POINT OR SIMILAR POINT ON A WAVE

John Granville Withers and Henry James Hulf, Sunbury-on-Thames, and Alexander Rubach, Feltham, England, assignors to Anglo-Iranian Oil Company Limited, London, England, a British joint-stock corporation Application June 10, 1950, Serial No. 167,444

3 Claims. (Cl. 73—116)

This invention relates to an electronic instrument for indicating or recording the periods between signals of two or more series of recurring signals. More particularly the invention relates to an electronic instrument for comparing the intervals between recurring events in an internal combustion engine.

Conventional prior instruments for measuring functions such as the ignition delay of an engine have necessitated the use of a cathode ray screen upon which was thrown a graphical trace of the required characteristics, such as cylinder pressure, on a time base.

To obtain the required measurements it was necessary to employ a double beam cathode ray tube or, when a single beam cathode ray tube was employed, to make provision for switching over from the graphical trace to a calibrating trace obtained for example from a signal, emitted as the engine revolved, giving crankangle degree markings.

In general, such methods necessitated the use of sliding cursors or other means of recording the characteristics of one trace whilst the second trace was referred to. Such methods were tedious and, in general, had the disadvantage that as traces were obtained on a time base they were dependent upon maintenance of a constant engine speed. Variations of engine speed would thus introduce errors and measurements of engine characteristics under conditions of acceleration or deceleration were not possible.

The A. S. T. M. method of Cetane No. determination involves adjusting the injection timing and compression ratio of the C. F. R. diesel engine, running under standard conditions, so that injection occurs 13° before top dead centre and combustion occurs at top dead centre. This fixed ignition delay of 13° is obtained for any fuel by a suitable adjustment of compression ratio; and the Cetane No. of a sample fuel is determined by interpolation between the compression ratios found for a five Cetane No. bracket of reference fuels.

Injection is detected by arranging that the motion of the spray valve closes a pair of electrical contacts and thereby flashes a gaseous discharge lamp mounted on the flywheel.

Combustion is detected by a bouncing pin, so adjusted that the contacts just fail to close on compression pressure alone. The increase of pressure due to combustion closes the contacts and flashes a second gaseous discharge lamp mounted on the flywheel. The lamps are so disposed that when injection and combustion occur at the correct times the respective flashes coincide with a cross-wire.

Some defects of this arrangement are:

(a) The contacts wear and require frequent cleaning and dressing because of contamination and pitting.

(b) The contact spring tensions require very accurate adjustment if the system is to work at all, and this necessitates frequent re-adjustment to compensate for wear and temperature effects.

(c) Since the contacts must be open initially, the indications are in error by the time taken for the gap to close. Tests in which an electromagnetic pick-up was used to detect injection have shown that the contact method of indication may lag as much as 2°.

(d) The method imposes considerable optical strain on an operator engaged in routine testing.

These defects are almost entirely due to the use of electrical contacts, and a method of presentation which is not remote indicating.

It is an object of the present invention to provide an improved electronic instrument for indicating or recording the periods between signals of two or more series of recurring signals. It is a further object to provide an electronic instrument for indicating, recording, measuring or comparing the intervals between recurring events in an internal combustion engine. It is a further object to provide an electronic instrument for indicating the ignition delay of an internal combustion engine of the compression-ignition type. Further objects will appear hereinafter.

These objects are accomplished by the provision of an electronic instrument comprising two or more sources of recurring positive excursion electrical signals of sharp narrow pulse, an electronic switch connected to the said sources and capable of functioning in each of two stable voltage states and adapted to transmute from one state to the other on receipt of the said electrical signals, said switch thereby producing an outgoing signal of rectangular wave form, and a meter, responsive to small current changes, connected to the said electronic switch and actuated by the said signal of rectangular wave form.

Preferably the meter is a sensitive moving coil galvanometer, such as a milli-ammeter.

Preferably each source of recurring positive excursion electrical signal of sharp narrow pulse comprises a source of a signal having a recurring positive excursion, the signal being fed to the grid of a thyratron valve operating under conditions such that an outgoing signal of the required type is derived from the cathode of the thyratron, the duration of the outgoing signal being controlled by the thyratron anode impedance.

Preferably the source of the initial signal having a recurring positive excursion comprises an amplifying valve having a grid circuit with a short time constant, said amplifying valve being coupled to the anode of the thyratron valve whereby the initial pulse of the incoming signal is passed to the thyratron valve and subsequent positive excursions of the same signal are suppressed.

Preferably also, the initial signal is passed through a circuit wherein the wave form of the initial signal is differentiated.

The initial signal will be generated in the manner most suited to the characteristic to be measured. In general, however, it is found convenient to employ an electromagnetic pick-up of variable reluctance type, the outgoing signal being amplified before differentiation as described above.

In its preferred embodiment therefore, the electronic instrument according to the invention comprises at least two signal producing units each comprising an electro-magnetic pick-up unit of variable reluctance and generating a recurring signal characteristic of a recurring condition of an internal combustion engine, an amplifying electronic valve receiving the initial signal, a circuit receiving the outgoing signal therefrom to provide a signal of positive going excursions and adapted to differentiate the wave form of the said outgoing signal, an amplifying valve whose input control grid circuit has a short time constant, for receiving the signal of differentiated wave form, and passing the initial pulse of said signal to a thyratron valve, the anode of said thyratron valve being coupled to the said control grid of the prior amplifying valve to suppress subsequent positive excursions of the signal received therein, whereby at the thyratron cathode, there is generated an electrical signal of sharp narrow pulse, constituting the outgoing signal of each of the signal producing units, a switch unit comprising an electronic switch capable of functioning in each of two stable voltage states and adapted to transmute from one state to the other on receipt of signals from one or other of the signal producing units and thereby produce an outgoing signal of rectangular wave form and a meter responsive to small current changes, actuated by the signal of rectangular wave forms.

The instrument according to the present invention is of particular value for use in conjunction with a compression ignition engine as an indicator of the delay between fuel injection and ignition, expressed in terms of degrees of crank-shaft angle. For this purpose the instrument comprises an electromagnetic pick-up unit actuated in response to movement of moving component of the fuel injector and an electromagnetic pick-up unit actuated by movement of a diaphragm in communication with engine cylinder pressure. Calibration is effected by provision of switching apparatus to switch out the above pick-up units and switch into circuit two fixed position pick-up units situated near a rotary component of the engine e. g. the flywheel at a known angle of revolution apart, conveniently 12.5°, and which pick-up units emit signals on the passage of a marked graduation on the moving part. The graduation may be a projection, preferably a chisel edge projection on or a groove in the rotary component.

The invention is illustrated in a preferred embodiment in Figures 1–11 which relate to an ignition delay meter for use in conjunction with a four stroke compression-ignition, internal combustion engine.

Figure 1 is a circuit diagram of the electronic instrument.

Figure 2 is a longitudinal cross-section of a pressure sensitive electromagnetic pick-up.

Figure 3 is a longitudinal cross-section of an injector electromagnetic pick-up.

Figure 4 is a longitudinal cross-section of a reference electromagnetic pick-up.

With reference to Figure 1 the electronic instrument comprises two identical trigger amplifiers, an electronic switch and a metering stage.

An injection responsive pick-up 1 gives rise to a pulse, of wave form shown in Figure 5 which is passed by switch 2, to the grid of a high gain R. F. pentode valve 3.

After amplification, the signal is resistance-capacity coupled from the anode of the valve 3, to the suppressor grid of amplifying valve 4, whose control grid input circuit has a short time constant, by means of capacity 5, and resistance 12, of such values that the signal is differentiated. Resistances 6, 8, 9 and capacitors 7 and 10 are connected in conventional manner and suitably valued to obtain maximum gain. Capacity 11 is suitably connected and valued to by-pass any undesirable R. F. signals superimposed on the input. The amplified signal is coupled from the anode of valve 4, to the grid of a gas filled tetrode valve 13. The initial positive part of the signal causes valve 13 to conduct, discharging capacity 14, which then slowly recharges to high potential. The negative voltage wave form produced at the anode of valve 13, illustrated in Figure 6, is coupled back to the control grid of valve 4 in such a manner that all subsequent positive excursions of the signal are suppressed. Resistances 15, 16, 17, 19, 20, 25 and 26 and capacities 14, 21, 23 and 24 are connected in conventional manner and suitably valued to attain valve operation in the manner described. Capacity 22 is suitably connected and valued to bypass any undesirable R. F. signals superimposed on the input. During the short period during which valve 13 conducts, a positive pulse of very short duration, illustrated in Figure 7 is produced at the cathode of valve 13. The signal is differentiated through coupling of capacity 27, and resistance 28 and is passed to the electronic switch.

A cylinder pressure-sensitive pick-up 29, having an output proportional to the rate of change of cylinder pressure and of wave form illustrated in Figure 8, is connected by switch 30, to an identical trigger amplifier to that described above, comprising a high gain R. F. pentode valve 31, valve 32 having a control grid circuit with a short time constant and a gas filled tetrode valve 33. Resistances 34—46 and capacities 47—56 are connected in the manner described above. Figure 9 illustrates the wave-form of the signal after differentiation by the coupling of capacity 50 and resistance 37. The signal further differentiated through the coupling of capacity 56, and resistance 46, is passed to the electronic switch. The potential wave illustrated in Fig. 9, after differentiation by capacity 56 and resistance 46, yields a sharp trigger potential pulse.

The electronic switch consists of four triode valves 57–60 connected so that the voltage relationships may be in one of two states of stable equilibrium.

The arrival of the injection trigger pulse causes the voltage at the anode of valve 59 to assume its upper stable value, and the arrival of the pressure actuated trigger pulse causes the voltage at the anode of valve 59, to revert to its lower stable value. The transition from one state to the other takes about 2 micro-seconds and the present circuit has been tested at switching rates up to 110,000 per second. Resistances 61—69 and condensers 70—72 are suitably connected and valued to operate the electronic switch and obtain a wave-form as illustrated in Figure 10.

The cyclical repetition of this process results in the generation of a train of rectangular waves, the mark-space ratio of which is directly proportional to the angular interval between injection and ignition. In the metering stage, the signal of rectangular wave form is resistance-capacity coupled by capacity 73 and resistance 74 and fed to the grid of a pentode valve 76 through resistance 75. The pentode valve 76 is normally cut-off, conduction occurring only in the interval between injection and ignition. The resulting pulses of anode current are smoothed by the anode capacity 84 to a mean value indicated by the moving coil meter 87.

In order that the mean value indicated by the meter 86 shall be proportional to the mark-space ratio only and not also to the recurring frequency it is essential that the charge and discharge constants of the anode circuit shall be equal. This is accomplished by ensuring that the internal impedance of valve 76 is very much higher than the anode load resistance 77, by the application of negative current feedback.

The resistances 77—82 and capacity 84 are suitably connected and valued to enable the valve 76 to operate in the manner described and a half wave rectifier 88 is placed across the indicating meter to protect the meter against overload currents.

Resistances 83 and capacity 85 are connected in the anode circuit of valve 76 in order to decouple the high voltage and prevent voltage fluctuations occurring at the anodes of the valves 57–60 of the electronic switch causing spurious operation.

Operating the electronic instrument on receipt of signals from the injector pick-up and the ignition (pressure actuated) pick up, a direct indication is obtained of the angular delay between injection and ignition.

In order that it may be possible to measure the angular relationship between injection and top dead centre of the engine, the switch 30 has an operating position in which the ignition pick-up is cut out of circuit and a reference pick-up 86 substituted to give a signal at engine top dead centre.

The initial signal wave form, illustrated in Figure 11, is converted to a trigger signal by the ignition trigger amplifier.

In order to calibrate the instrument to give measurements in degrees of crank angle, the switch 2 has an operating position in which the injection pick-up is cut out of circuit and a second reference pick-up 87 is substituted to give a signal at 12.5° before engine top dead centre.

The switches 2 and 30 are ganged to give the following three positions:

(1) Measurement of ignition delay—injection pick-up and ignition pick-up in circuit.

(2) Measurement of injection advance—injection pick-up and reference pick-up at top dead centre in circuit.

(3) Calibration—top dead centre reference pick-up and 12.5° reference pick up in circuit.

The calibration square wave occurs every revolution while the delay and injection square waves recur every two revolutions in the case of a four-stroke engine. Thus the standard calibrating-meter deflection is double, and in the case considered is equivalent to 25°. The meter deflection is then adjusted to read full scale by varying the anode current through valve 76 by means of variable resistance 80.

To ensure the stability of meter calibrations, the high voltage supply and screen grid voltage supply for valves 4 and 32 are stabilised by means of a neon gas stabiliser.

The following table indicates, with reference to Figure 1, the preferred components for use in an ignition delay meter according to the invention.

Table

| Reference No.— Figure 1 | Component Type | Specification |
| --- | --- | --- |
| 3, 31 | Valve | 6SJ7. |
| 4, 32 | do | 6SA7. |
| 13, 33 | do | 2050. |
| 57 and 60 | do | 6SL7. |
| 58 and 59 | do | 6SN7. |
| 76 | do | 6AC7. |
| 6, 34 | Resistor | 2.5 M. |
| 9, 36 | do | 1.5 K. |
| 8, 35 | do | 500 K. |
| 12, 37, 17, 40, 18, 41, 74 | do | 2.2 M. |
| 15, 38, 19, 42, 63 | do | 47 K. |
| 66, 77, 64, 67 | do | 47 K. |
| 16, 39, 28, 46, 83, 78 | do | 10 K. |
| 20, 43, 75 | do | 1 M. |
| 26, 44 | do | 3.3 K. |
| 25, 45 | do | 75 K. |
| 68, 82 | do | 5 K. |
| 65 | do | 15 K. |
| 61, 62 | do | 22 K. |
| 69, 79 | do | 100 K. |
| 81 | do | 2.2 K. |
| 80 | do | 5 K Variable. |
| 7, 47, 21, 51 | Condenser | .01 microfarad. |
| 10, 48 | do | 25 microfarads. (25 Volt electrolytic.) |
| 11, 49 | do | .005 microfarad. |
| 5, 50, 22, 52, 23, 53 | do | .001 microfarad. |
| 24, 54 | do | .003 microfarad. |
| 14, 55 | do | .002 microfarad. |
| 27, 56, 70, 72 | do | 50 Micromicrofarads. |
| 71 | do | .02 microfarad. |
| 73 | do | .5 microfarad. |
| 84 | do | 20 microfarads. |
| 85 | do | 8 microfarads. |
| 86 | Meter | 250 micro amp. moving coil meter. |

The ignition (pressure sensitive) pick-up illustrated in Figure 2 is described in detail.

A mild steel diaphragm 108, whose thickness is .032 in., is located on a seat at the bottom of the stainless steel body 101 and held there by means of the stainless steel inner body 102 which screws into the outer body and clamps the diaphragm round its periphery. The 35% cobalt magnet 103 with its "Stalloy" (3% silicon-iron) inserted pole 104 is arranged by means of a suitably sized spacer washer 107 such that the pole tip is .002 in. clear of the diaphragm. The magnet is a sliding fit in the inner body and is held in position by the clamping nut 109. The terminal takes the form of an amphenol type socket 110 screwed into the top of the inner body above the clamping nut. The pick-up coil 105 of 7,000 turns wound on the "Stalloy" pole piece in a clock-wise direction, looking at the end of the pole with the beginning of the winding soldered to the pole and the lead at the other end of the winding brought out through a hole in the magnet to the terminal 110. The magnet is magnetised such that the pole end has a north polarity.

The pressure pick-up assembly is screwed into the engine cylinder so that the mild steel diaphragm 108 is subjected to engine cylinder pressure.

Figure 3 illustrates the injector pick-up assembly screwed into the injector nozzle body 119 so that the "Stalloy" pole 115 is positioned inside the injector spring 120 as illustrated. The lift pressure of the injector spindle 117 is adjusted by means of shims placed between the spring and of the stainless steel body 11. The "Stalloy" pole is inserted into the 35% cobalt steel magnet 112 which, in turn is screwed into the body such that the distance between the end of the pole and the spindle is .060 in. Lock nut 113 clamps the pick-up in position. The amphenol type terminal socket 114 is screwed into the top of the magnet. The pick-up coil of 5,000 turns is wound on the "Stalloy" pole in a clockwise direction, looking at the end of the pole, with the beginning of the winding connected to the pole and the lead on the other end of the winding brought out through a hole in the magnet to the terminal 114. Brass flange 116 is used to retain the turns of the winding at the pole end, the magnet being magnetised such that the pole end has a north polarity.

With reference to Figure 4, the reference pick-up consists of a magnet and pole 122 made in one piece from 35% cobalt steel, with opposite sides of the pole tip 127 tapered to form a chisel edge. The magnet is threaded so that the pick-up can be locked in position and attached to a carrier plate by means of locknut 123. The terminal 121 is of the amphenol type socket screwed into the head of the magnet. The coil of 200 turns is wound on a split brass bobbin 124 in a clockwise direction looking at the end of the pole. The beginning of the winding is soldered to the pole and the lead at the opposite end of the winding led through a hole in the magnet to the terminal. The magnet is magnetised such that the pole end has a south polarity.

All pick-up windings described with reference to Figures 2-4 are baked in Bakelite varnish.

We claim:

1. A system for determining the phase between electric waves comprising an electronic switch having two stable switching conditions and having two inputs for operating the switch to change the condition thereof, a pair of cascaded differentiating means connected to one input, a pair of cascaded differentiating means connected to the other input, inputs for each of the differentiating means for supplying the waves thereto, means controlled by the cycling of said switch for indicating phase, whereby points of inflection of a potential curve rather than amplitude may be the determinant and wherein each pair of cascaded differentiating means includes the following: a vacuum tube amplifying stage having the input thereof connected to receive the output of the first of the pair of cascaded differentiating means, an electron discharge device having at least cathode, control grid and anode with the input thereof connected to receive the output of said amplifying stage, said last named electron discharge device having a cathode follower output circuit, said second differentiating means being connected in said cathode follower output circuit, and coupling means connecting the anode of said electron discharge device and an input of the amplifying stage for suppressing additional pulses from said amplifying stage for a period long in comparison to a pulse duration.

2. A system for determining the phase between electric waves comprising an electronic switch having two stable switching conditions and having two inputs for operating the switch to change the condition thereof, at least one differentiating means connected to one input, at least one differentiating means connected to the other input, inputs for each of the differentiating means for supplying the waves thereto, means controlled by the cycling of said switch for indicating waves whereby points of inflection of a potential curve rather than amplitude may be the determinant and wherein said electronic switch is of the type providing two electron discharge paths with one path being active and the other path being inactive for alternate switch positions and wherein the indicating means includes an electron discharge device having at least cathode, control grid and anode with the input thereof connected to one of the switch discharge paths so that said last-named electron discharge tube may have space current or be cut off depending upon the condition of the electron switch and wherein said last named electron discharge device has in the anode circuit a meter and high impedance means in series across a condenser, said high impedance means having a substantially higher impedance than the impedance of said last-named electron discharge device when conducting whereby the charging and discharging rates are substantially equal over different switch operating cycles.

3. In a system of the character described, means for producing a trigger pulse comprising a vacuum tube having at least a cathode, two control grids and anode, an input circuit having a short time constant connected to one control grid for differentiating a signal supplied to said one control grid, a grid controlled gas discharge tube, means for coupling the anode of said vacuum tube to the grid of the gas discharge tube, a condenser connected between the anode of said gas discharge tube and the other control grid of said vacuum tube, a resistor connected between the other control grid of said vacuum tube and the cathode thereof, said last-named condenser and resistor together providing negative feedback to the vacuum tube and a differentiating circuit in the output of said gas discharge device.

JOHN GRANVILLE WITHERS.
HENRY JAMES HULF.
ALEXANDER RUBACH.

References Cited in the file of this patent
UNITED STATES PATENTS

| Number | Name | Date |
|---|---|---|
| 2,192,863 | Hetzel et al. | Mar. 5, 1940 |
| 2,340,714 | Traver et al. | Feb. 1, 1944 |
| 2,370,692 | Shepherd | Mar. 6, 1945 |
| 2,395,902 | Nisewanger et al. | Mar. 5, 1946 |